(12) United States Patent
Li et al.

(10) Patent No.: US 12,174,497 B2
(45) Date of Patent: Dec. 24, 2024

(54) DISPLAY PANEL AND DISPLAY DEVICE

(71) Applicant: Shenzhen China Star Optoelectronics Semiconductor Display Technology Co., Ltd., Guangdong (CN)

(72) Inventors: Mingming Li, Guangdong (CN); Baixiang Han, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 266 days.

(21) Appl. No.: 17/637,086

(22) PCT Filed: Jan. 25, 2022

(86) PCT No.: PCT/CN2022/073800
§ 371 (c)(1),
(2) Date: Feb. 22, 2022

(87) PCT Pub. No.: WO2023/133938
PCT Pub. Date: Jul. 20, 2023

(65) Prior Publication Data
US 2023/0229043 A1    Jul. 20, 2023

(30) Foreign Application Priority Data
Jan. 17, 2022 (CN) .......................... 202210050304.3

(51) Int. Cl.
*G02F 1/1345* (2006.01)

(52) U.S. Cl.
CPC ................................ *G02F 1/13452* (2013.01)

(58) Field of Classification Search
None
See application file for complete search history.

(56) References Cited

U.S. PATENT DOCUMENTS

2022/0121057 A1*  4/2022  Wang ................ G02F 1/136204

FOREIGN PATENT DOCUMENTS

| CN | 205140985 U | | 4/2016 |
|---|---|---|---|
| CN | 106125424 | * | 11/2016 |
| CN | 106444182 | * | 2/2017 |
| CN | 109148541 A | | 1/2019 |
| CN | 109410765 A | | 3/2019 |
| CN | 111341824 A | | 6/2020 |
| CN | 112750843 A | | 5/2021 |
| JP | 2005340294 A | | 12/2005 |
| WO | 2022160491 | * | 8/2022 |

* cited by examiner

*Primary Examiner* — Ashok Patel
(74) *Attorney, Agent, or Firm* — Rivka Friedman

(57) ABSTRACT

A display panel and a display device are provided. The display panel has a first area, a second area, and a third area arranged in sequence. The display panel includes a substrate, a plurality of first wirings, and a plurality of second wirings. The first wirings extend from the first area to the second area. The second wirings extend from the second area to the third area. The first wirings and the second wirings are arranged in different layers. The first wirings and the second wirings are connected in a one-to-one correspondence through via holes. The via holes are staggered in the second area.

20 Claims, 6 Drawing Sheets

DISPLAY PANEL AND DISPLAY DEVICE

FIELD OF INVENTION

The present application relates to the field of display technologies, and more particularly to a to a display panel and a display device.

BACKGROUND OF INVENTION

In display panels, it is common to electrically connect wirings of different film layers through via holes. During the research and practice of the prior art, inventors of the present application found that in the process of forming the via hole, it is easy to form a long groove on an insulating layer due to an issue of over-etching. As a result, stress concentration is generated at the groove and the via hole, which affects a life of a flexible display panel.

Technical Problem

The embodiments of the present application provide an array substrate and a liquid crystal display panel provided by the embodiments of the present application, which can improve dark groups in a curved display screen by buffering pretilt angle conflicts of liquid crystal molecules corresponding to junctions of adjacent alignment areas in pixels.

SUMMARY OF INVENTION

Embodiments of the present application provide a display panel and a display device, which can improve an issue of stress concentration at a via hole of transfer wirings in the display panel.

Embodiments of the present application provide a display panel, the display panel has a first area, a second area, and a third area arranged in sequence, and the display panel comprises:
  a substrate;
  a plurality of first wirings, wherein the first wirings are arranged on the substrate and are arranged at intervals, and the first wirings extend from the first area to the second area; and
  a plurality of second wirings, wherein the second wirings are arranged on the substrate and arranged at intervals, the second wirings extend from the second area to the third area, the first wirings and the second wirings are arranged in different layers, the first wirings and the second wirings are connected in a one-to-one correspondence through via holes, and the via holes are staggered in the second area.

Optionally, in some embodiments of the present application, the display panel further comprises an insulating layer, the insulating layer is arranged on a side of the first wiring and the second wiring away from the substrate, the insulating layer is provided with a through hole, and an orthographic projection of the via hole on the substrate is located within an orthographic projection of the through hole on the substrate.

Optionally, in some embodiments of the present application, adjacent n through holes form a group, and corresponding via holes in each group of the through holes are arranged in a staggered manner, wherein n is a natural number greater than or equal to 2.

Optionally, in some embodiments of the present application, at least a part of the first wiring or at least a part of the second wiring has a bending wiring portion.

Optionally, in some embodiments of the present application, the bending wiring portion is arranged in the second area.

Optionally, in some embodiments of the present application, the bending wiring portion comprises a plurality of bending units connected in sequence, the bending units are connected to at least one parallel wiring, and the parallel wiring is arranged in parallel with the bending wiring portion.

Optionally, in some embodiments of the present application, a width of the first wiring is greater than a width of the second wiring.

Optionally, in some embodiments of the present application, the display panel further comprises a chip on film, the chip on film is arranged in the third area, the second wiring is connected with the chip on film, and the second area is a bending area.

Optionally, in some embodiments of the present application, a vertical distance between the first wiring and the substrate is greater than a vertical distance between the second wiring and the substrate.

Optionally, in some embodiments of the present application, the display panel further comprises an interlayer insulating layer, the interlayer insulating layer is arranged on the second wiring, the first wiring is arranged on the interlayer insulating layer, and the via hole is opened on the interlayer insulating layer.

Correspondingly, embodiments of the present application further provide a display device, the display device comprises a display panel and a packaging structure, the display panel has a first area, a second area, and a third area arranged in sequence, and the display panel comprises:
  a substrate;
  a plurality of first wirings, wherein the first wirings are arranged on the substrate and are arranged at intervals, and the first wirings extend from the first area to the second area; and
  a plurality of second wirings, wherein the second wirings are arranged on the substrate and arranged at intervals, the second wirings extend from the second area to the third area, the first wirings and the second wirings are arranged in different layers, the first wirings and the second wirings are connected in a one-to-one correspondence through via holes, and the via holes are staggered in the second area;
  wherein the packaging structure is arranged on the display panel.

Optionally, in some embodiments of the present application, the display panel further comprises an insulating layer, the insulating layer is arranged on a side of the first wiring and the second wiring away from the substrate, the insulating layer is provided with a through hole, and an orthographic projection of the via hole on the substrate is located within an orthographic projection of the through hole on the substrate.

Optionally, in some embodiments of the present application, adjacent n through holes form a group, and corresponding via holes in each group of the through holes are arranged in a staggered manner, wherein n is a natural number greater than or equal to 2.

Optionally, in some embodiments of the present application, at least a part of the first wiring or at least a part of the second wiring has a bending wiring portion.

Optionally, in some embodiments of the present application, the bending wiring portion is arranged in the second area.

Optionally, in some embodiments of the present application, the bending wiring portion comprises a plurality of bending units connected in sequence, the bending units are connected to at least one parallel wiring, and the parallel wiring is arranged in parallel with the bending wiring portion.

Optionally, in some embodiments of the present application, a width of the first wiring is greater than a width of the second wiring.

Optionally, in some embodiments of the present application, the display panel further comprises a chip on film, the chip on film is arranged in the third area, the second wiring is connected with the chip on film, and the second area is a bending area.

Optionally, in some embodiments of the present application, a vertical distance between the first wiring and the substrate is greater than a vertical distance between the second wiring and the substrate.

Optionally, in some embodiments of the present application, the display panel further comprises an interlayer insulating layer, the interlayer insulating layer is arranged on the second wiring, the first wiring is arranged on the interlayer insulating layer, and the via hole is opened on the interlayer insulating layer.

Beneficial Effect

Embodiments of the present application provide a display panel and a display device. The display panel has a first area, a second area, and a third area arranged in sequence. The display panel includes a substrate, a plurality of first wirings, and a plurality of second wirings. The first wirings are arranged on the substrate and are arranged at intervals. The first wirings extend from the first area to the second area. The second wirings are arranged on the substrate and are arranged at intervals. The second wirings extend from the second area to the third area. The first wirings and the second wirings are arranged in different layers. The first wirings and the second wirings are connected in a one-to-one correspondence through via holes. The via holes are staggered in the second area. In the display panel provided by the embodiment of the present application, the via holes connecting the first wirings and the second wirings are staggered. In the process of forming the via holes, even if an issue of over-etching occurs, grooves produced by the over-etching will not be on the same straight line with adjacent via holes. Therefore, the stress at the grooves and the via holes can be dispersed, and an issue of stress concentration occurring at the via holes of transfer wirings can be improved.

DESCRIPTION OF DRAWINGS

In order to illustrate the technical solutions in the embodiments of the present application more clearly, the following briefly introduces the accompanying drawings that need to be used in the description of the embodiments. Obviously, the drawings in the following description are only some embodiments of the present application. For those skilled in the art, other drawings can also be obtained from these drawings without creative effort.

DETAILED DESCRIPTION OF PREFERRED EMBODIMENTS

Figure 1:
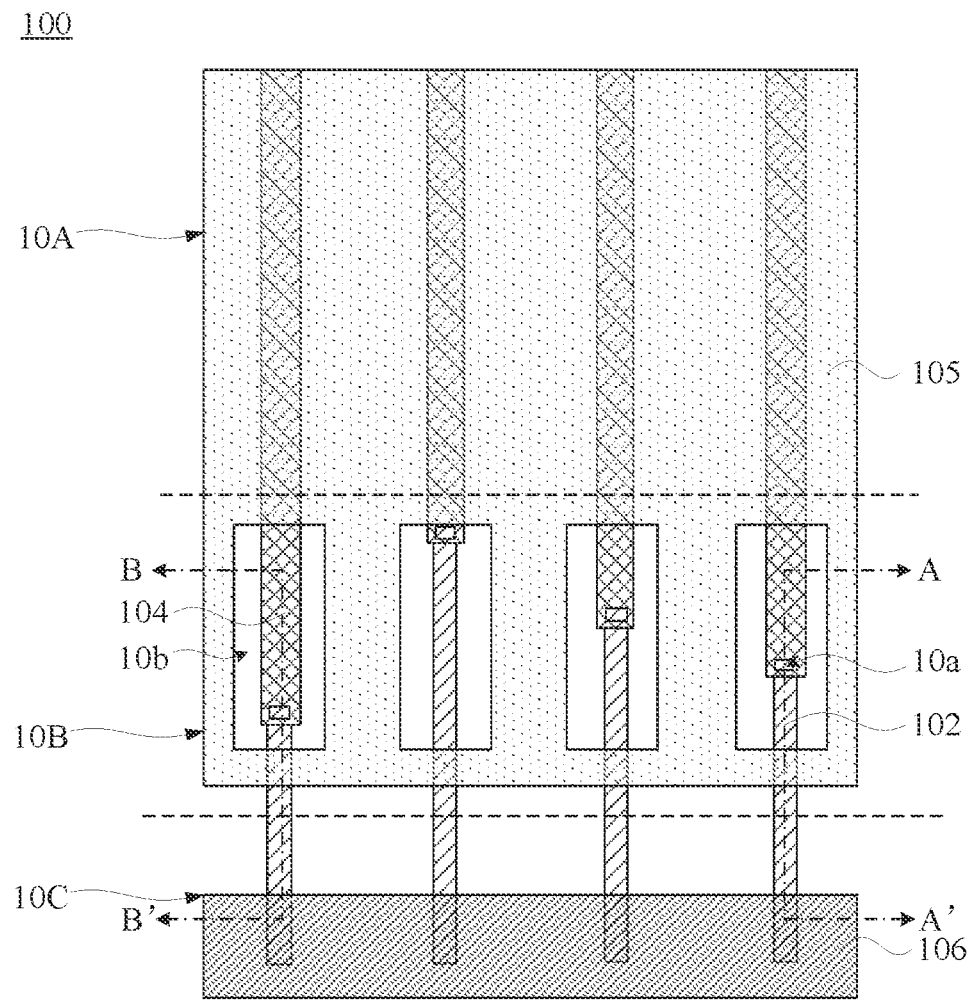
FIG. 1 is a schematic diagram of a first top-view structure of a display panel provided by an embodiment of the present application.

The technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in this application, all other embodiments obtained by those skilled in the art without creative efforts shall fall within the protection scope of this application. In addition, it should be understood that the specific embodiments described herein are only used to illustrate and explain the present application, but not to limit the present application. In this application, unless stated to the contrary, the use of directional words such as "upper" and "lower" generally refers to upper and lower in the actual use or working state of the device. Specifically, it is the direction of the drawing in the accompanying drawings. Further, "inside" and "outside" refer to the outline of the device.

Embodiments of the present application provide an array substrate and a method for fabricating the array substrate. Each of them will be described in detail below. It should be noted that the description order of the following embodiments is not intended to limit the preferred order of the embodiments.

Figure 2:
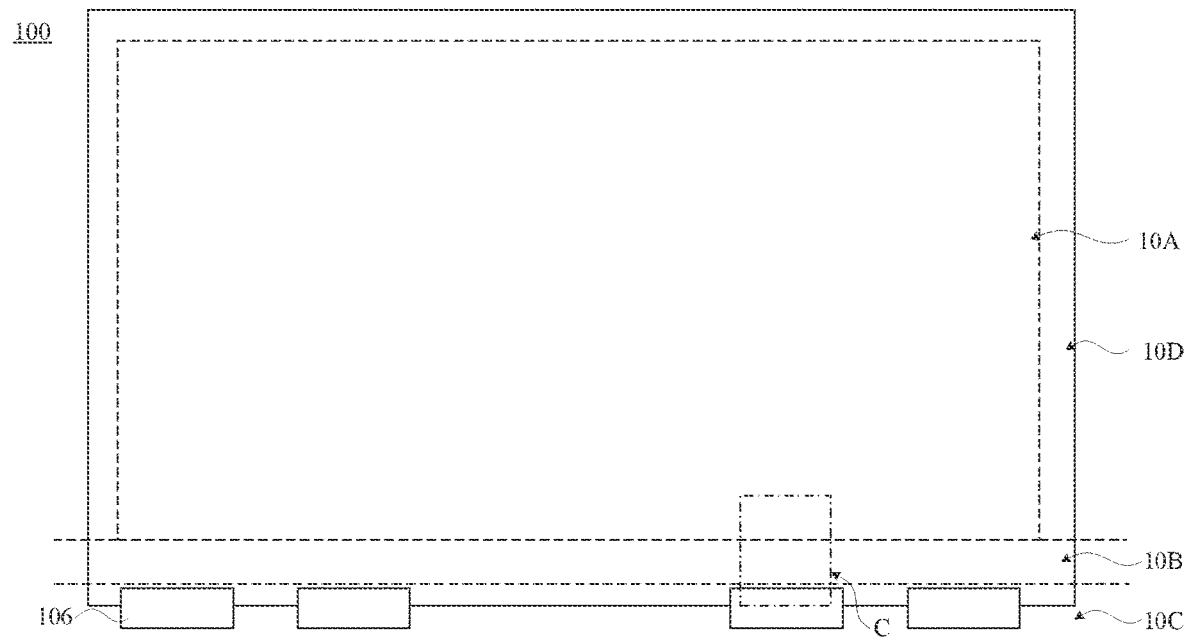
FIG. 2 is a schematic structural diagram of a display panel provided by an embodiment of the present application.
Figure 3:
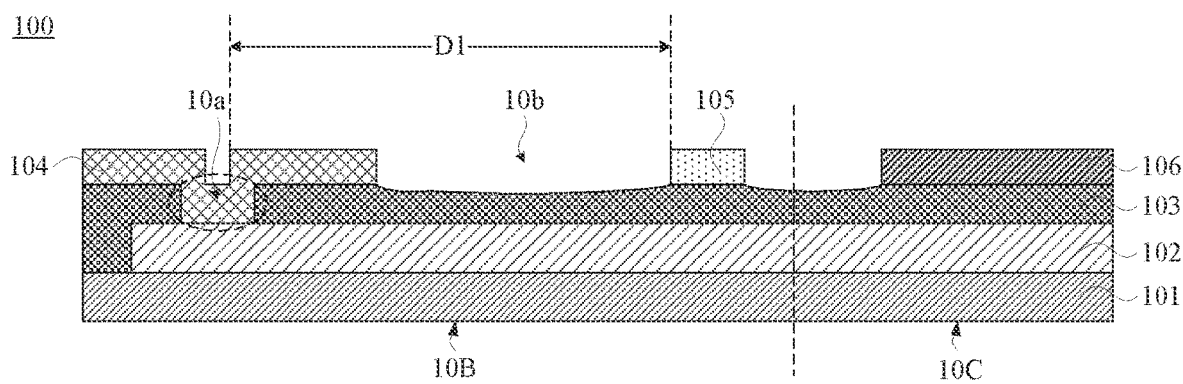
FIG. 3 is a schematic diagram of a cross-sectional structure along a line AA' in FIG. 1.
Figure 4:
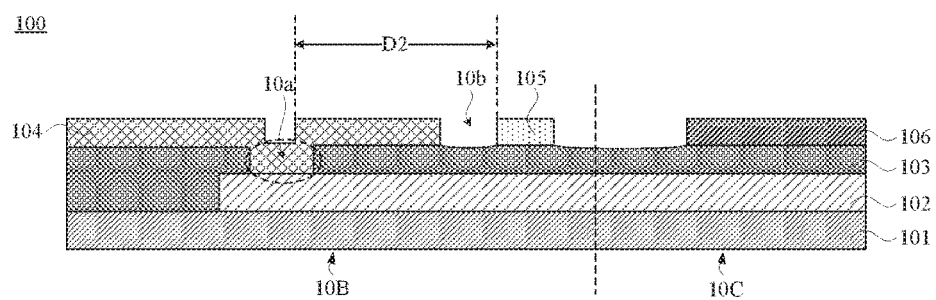
FIG. 4 is a schematic diagram of a cross-sectional structure along a line BB' in FIG. 1.

Referring to FIG. 1 to FIG. 4, FIG. 1 is a schematic diagram of a first top-view structure of a display panel provided by an embodiment of the present application, FIG. 2 is a schematic structural diagram of a display panel provided by an embodiment of the present application, FIG. 3 is a schematic diagram of a cross-sectional structure along a line AA' in FIG. 1, and FIG. 4 is a schematic diagram of a cross-sectional structure along a line BB' in FIG. 1. The display panel 100 has a first area 10A, a second area 10B, and a third area 10C arranged in sequence. The display panel 100 includes a substrate 101, a plurality of first wirings 104, and a plurality of second wirings 102. The first wirings 104 are disposed on the substrate 101. The first wirings 104 extend from the first area 10A to the second area 10B, and the first wirings 104 are arranged at intervals. The second wirings 102 are disposed on the substrate 101. The second wirings 102 extend from the second area 10B to the third area 10C, and the second wirings 102 are arranged at intervals. The first wirings 104 and the second wirings 102 are disposed in different layers. The first wirings 104 and the second wirings 102 are connected in a one-to-one correspondence through via holes 10a. The via holes 10a are staggered in the second area 10B.

The display panel 100 provided by the embodiment of the present application has a first area 10A, a second area 10B, and a third area 10C arranged in sequence. The first area 10A, the second area 10B, and the third area 10C may all be located in a display area of the display panel 100. In the display area of the display panel 100, there are usually cases where metal wirings are formed in different film layers and connected through the via holes 10a. Further, if positions of the via holes 10a of the transfer wirings are not designed, the via holes 10a may also have an issue of over-etching. In addition, the first area 10A, the second area 10B, and the third area 10C may respectively refer to an active area (AA), a bending area, and a binding area of the display panel 100. This case will be described in detail below.

When the via holes 10a are fabricated, an etching method is usually used. However, due to the limitation of process conditions, the issue of over-etching is easy to occur during etching. Therefore, if the connecting via holes 10a of the first wirings 104 and the second wirings 102 are arranged on the same straight line, it is easy to make grooves generated by over-etching during the etching of the via holes 10a extend on the same straight line. This further leads to the issue of stress concentration at the grooves and the via holes 10a generated by the over-etching. In the display panel 100 provided by the embodiment of the present application, the via holes 10a connecting the first wirings 104 and the second wirings 102 are staggered. In the process of forming the via holes 10a, even if the issue of over-etching occurs, the grooves generated by the over-etching will not be on the same straight line with the adjacent via holes 10a. Therefore, the stress at the grooves and the via holes 10a can be dispersed, and the issue of stress concentration occurring at the via holes 10a of the transfer wirings can be improved.

It can be understood that, in order to show the top-view structure of the wirings more clearly in the display panel 100, the substrate is not shown in FIG. 1. In addition, the upper film layer is illustrated with a translucent pattern to clearly show the upper-lower lamination relationship between the film layers.

Optionally, continuing to refer to FIG. 1, the display panel 100 further includes an insulating layer 105. The insulating layer 105 is disposed on a side of the first wiring 104 and the second wiring 102 away from the substrate 101. The insulating layer 105 is provided with a through hole 10b. An orthographic projection of the via hole 10a on the substrate 101 is located within an orthographic projection of the through hole 10b on the substrate 101.

In a flexible display panel, the display panel 100 often needs to be bent or curved. Then the wirings in the panel are easily squeezed when bent. Therefore, covering the first wirings 104 and the second wirings 102 with the insulating layer 105 can protect the first wirings 104 and the second wirings 102. This prevents an issue of short circuit or open circuit of the first wirings 104 and the second wirings 102 when the display panel 100 is bent.

In addition, the insulating layer 105 is provided with a through hole 10b. The through hole 10b is provided in the second area 10B. The through hole 10b is provided to disperse the bending stress when the second area 10B is bent. In addition, due to the wiring is transfer in the second area 10B, a wiring transfer area has many film layers and has a large thickness. The provision of the through hole 10b can reduce a film thickness of the wiring transfer area and further reduce the bending stress.

Optional, referring to FIG. 1 and FIG. 2. FIG. 1 is a partial enlarged schematic view of C in FIG. 2. The display panel 100 provided by the embodiment of the present application further includes a chip on film 106. The chip on film 106 is disposed in the third area 10C. The second wirings 102 are connected to the chip on film 106. The second area 10B is a bending area. Optionally, the first area 10A is a display area, and the third area 10C is a binding area. The display panel further includes a fourth area 10D. The fourth area 10D is a non-display area, which may also be called a frame area. The second area 10B and the fourth area 10D at least partially overlap.

A chip on film (COF) is bound on the binding area of the display panel 100. The COF is constructed by bonding and mounting chips (e.g., source driver ICs or gate driver ICs) on a flexible wiring substrate on which wiring patterns are formed. The wiring pattern of the COF is usually composed of inner leads connected to electrodes of the chip and outer leads connected to an external circuit. The second wirings 102 connect the COF and the first wirings 104 of the display area. The second wirings 102 transmit an output signal of the COF to the first wirings 104, which is then input to the display panel 100.

In order to increase a screen ratio of the display area of the display panel 100, a frame of the display panel 100 is narrowed. Generally, a part of the display panel 100 can be bent to a back of the display panel 100. In this embodiment, the third area 10C can be bent to the back of the display panel 100. In order to prevent the wirings from being exposed to the outside during bending, the first wirings 104 in the display area are usually routed to the second wirings 102 made of the lower metal film layer through the via holes 10a, and then bent to the back of the display panel 100.

In the embodiment of the present application, because the via holes 10a are disposed in dislocation, the grooves generated by over-etching are not easily connected together during fabrication. Therefore, the issue of stress concentration at the via holes 10a is less likely to occur. When the third area 10C of the display panel 100 is bent to the back of the display panel 100, an issue of film breakage due to the bending stress will not occur, and a failure of the display panel 100 can be avoided.

Optional, referring to FIG. 3 and FIG. 4. The via holes 10a are staggered in the second area 10B. The distance D1 between the via hole 10a at the line AA' and the insulating layer 105 near the third area 10C may be different from the distance D2 between the via hole 10a at the line BB' and the insulating layer 105 near the third area 10C.

Optionally, a vertical distance between the first wiring 104 and the substrate 101 is greater than a vertical distance between the second wiring 102 and the substrate 101.

When the display panel 100 needs to be bent, the second area 10B can be used as the bending area for bending. Therefore, in the second area 10B, the first wirings 104 are routed to the lower metal wirings, that is, the second wirings 102. In this way, the wirings in the bending area can be closer to a bending center, thereby reducing the bending stress on the second wirings 102 during bending.

Specifically, the display panel 100 further includes an interlayer insulating layer 103. The interlayer insulating layer 103 is disposed on the second wirings 102. The first wirings 104 are disposed on the interlayer insulating layer 103, and the via holes 10a are opened on the interlayer insulating layer 103. A material of the interlayer insulating layer 103 may be selected from one or a combination of silicon dioxide, nitrogen dioxide, and silicon oxynitride.

Figure 5:
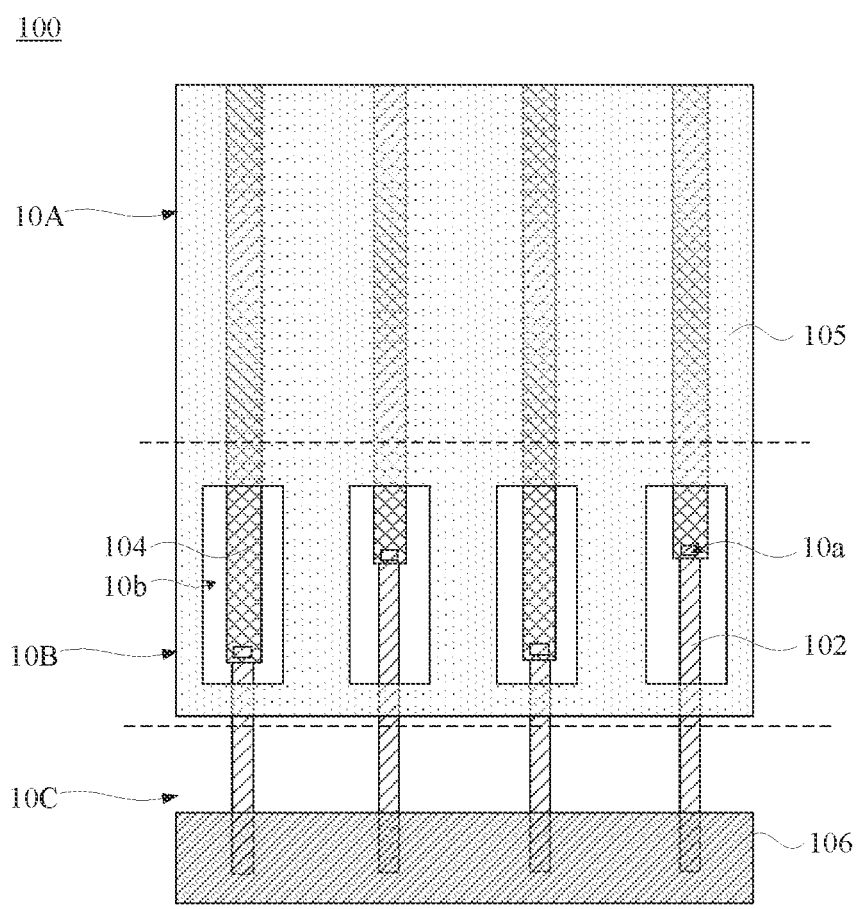
FIG. 5 is a schematic diagram of a second top-view structure of a display panel provided by an embodiment of the present application.

Optional, referring to FIG. 1 and FIG. 5. FIG. 5 is a schematic diagram of a second top-view structure of a display panel provided by an embodiment of the present application. Adjacent n through holes 10b form a group, and the corresponding via holes 10a in each group of through holes 10b are staggered, wherein n is a natural number greater than or equal to 2.

Specifically, n can be 2, 3, 4, 5, or 6. For example, when n is 2, please refer to FIG. 5, two adjacent through holes 10b form a group, and the corresponding via holes 10a in each group of through holes 10b are staggered. The embodiment shown in FIG. 5 can be understood that the via holes 10a of the odd-numbered wirings are arranged on the same straight line, and the via holes 10a of the even-numbered wirings are arranged on another straight line. In this way, the design of staggered arrangement of the via holes 10a connecting the first wirings 104 and the second wirings 102 is simple in process and easy to implement. Moreover, the dislocation of the via holes 10a can be realized under simple process conditions, the distance between the grooves generated by the over-etching of the adjacent via holes 10a can be increased, and the stress concentration at the transfer wiring can be improved.

For example, when n is 4, please continue to refer to FIG. 1, the embodiment shown in FIG. 1 is described by taking four adjacent through holes 10b as a group, and the corresponding via holes 10a in each group of through holes 10b are staggered as an example for description. In the same group of through holes 10b, the via holes 10a corresponding to the through holes 10b are not on the same straight line in the through holes 10b. This arrangement can ensure that the via holes 10a have a better staggered effect, and more effectively avoid the issue of stress concentration.

When n is 2, the via holes 10a in the adjacent groups of through holes 10b may also be staggered. Please continue to refer to FIG. 1, FIG. 1 may also refer to a group of two adjacent through holes 10b, and the corresponding via holes 10a in each group of through holes 10b are staggered. In addition, the via holes 10a in the adjacent groups of the through holes 10b are also staggered. Of course, when n takes other values, the via holes 10a in the adjacent groups of through holes 10b can also be staggered.

For the value of n, all natural numbers greater than or equal to 2 are within the protection scope of the embodiments of the present application. The embodiments of the present application take n as 2, 3, 4, 5, and 6 as examples, and specifically describe the structures when n is 2 and 4 but are not intended to limit the embodiments of the present application. It can be understood that the value of n should not be too large because in the display panel 100, the area of the through hole 10b is limited. It is preferable that the orthographic projection of the via hole 10a and the substrate 101 is located in the orthographic projection area of the through hole 10b on the substrate 101. When the value of n is too large, it cannot be guaranteed that the distance between the grooves generated by the over-etching of two adjacent via holes 10a in the direction of the wirings can be widened. This may still cause the grooves generated by the over-etching to be connected, so as to concentrate stress, thereby affecting the performance of the display panel 100.

Figure 6:
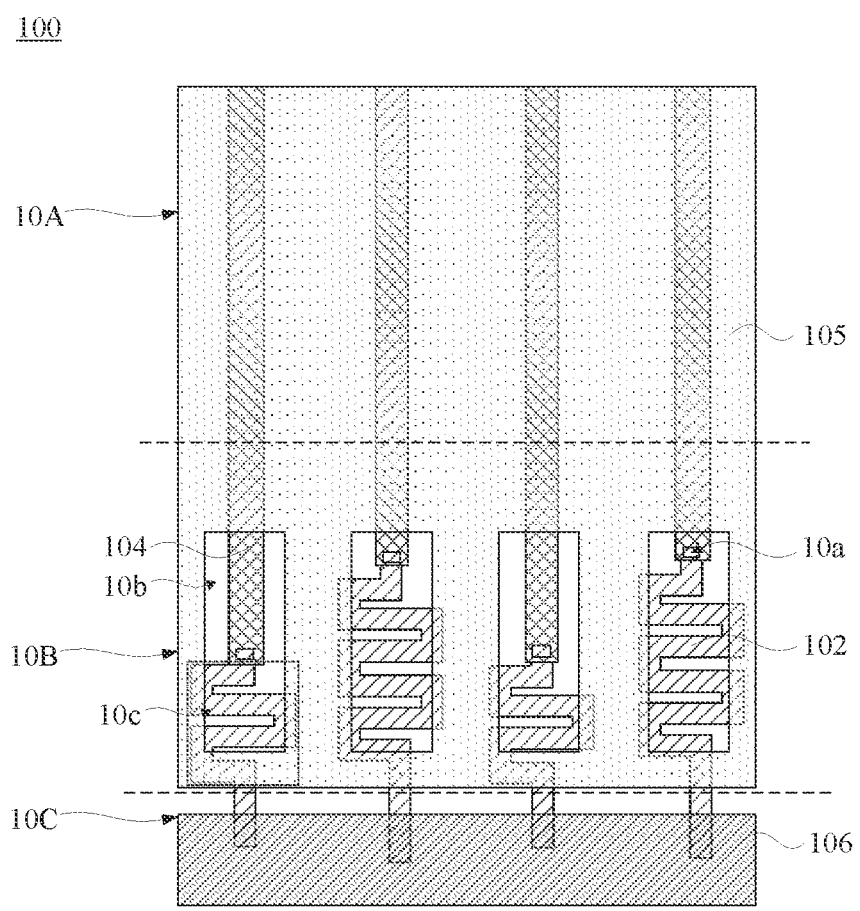
FIG. 6 is a schematic diagram of a third top-view structure of a display panel provided by an embodiment of the present application.

Optionally, referring to FIG. 6, FIG. 6 is a schematic top-view structure diagram of a display panel provided by an embodiment of the present application. In the embodiment shown in FIG. 6, at least part of the second wiring 102 has a bending wiring portion 10c. It can be understood that lengths of the bending wiring portions 10c of different second wirings 102 may be different. The bending wiring portion 10c is designed by bending and winding the part of the second wiring 102. Optionally, the bending wiring portion 10c may be arranged in the second area 10B. When the second area 10B is a bending area, the bending and winding design of the bending wiring portion 10c can further disperse the stress.

In addition, because the via holes 10a are staggered, lengths of the second wirings 102 are different. By designing the bending wiring portion 10c for the second wiring 102, the lengths of the second wirings 102 can be made the same or approximately the same. This solves an issue of inconsistent resistance and capacitance of the second wirings 102 in different rows. In the display panel 100 provided by the embodiment of the present application, an issue of bright and dark lines on the panel can be improved by designing the bending manner of the second wiring 102.

When the first area 10A is the display area, the second area 10B is the bending area, and the third area 10C is the binding area, a width of the second wiring 102 is usually set to be smaller than a width of the first wiring 104. Therefore, it is easier to implement in the manufacturing process that the bending wiring portion 10c is provided on the second wiring 102 with a thinner wiring width.

Figure 7:
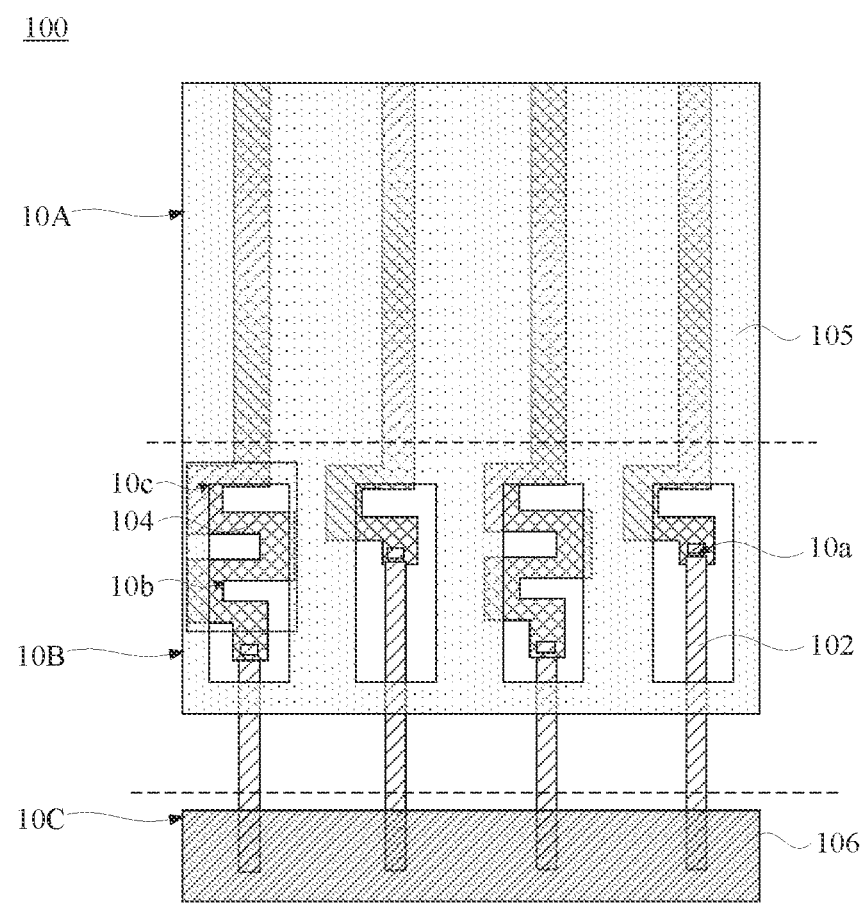
FIG. 7 is a schematic diagram of a fourth top-view structure of a display panel provided by an embodiment of the present application.

Optionally, referring to FIG. 7, FIG. 7 is a schematic diagram of a fourth top-view structure of a display panel provided by an embodiment of the present application. In the embodiment shown in FIG. 7, at least part of the first wiring 104 has a bending wiring portion 10c. It can be understood that the lengths of the bending wiring portions 10c of different first wirings 104 may be different. The bending wiring portion 10c is designed by bending and winding the part of the first wiring 104. Optionally, the bending wiring portion 10c may be arranged in the second area 10B. When the second area 10B is a bending area, the bending and winding design of the bending wiring portion 10c can further disperse the stress.

In addition, because the via holes 10a are staggered, the lengths of the first wirings 104 are different. By designing the bending wiring portion 10c for the first wiring 104, the lengths of the first wirings 104 can be made the same or approximately the same. This solves the issue of inconsistent resistance and capacitance of the first wirings 104 in different rows. In the display panel 100 provided by the embodiment of the present application, the issue of bright and dark lines on the panel can be improved by designing the bending method of the first wiring 104.

When the first area 10A is the display area, the second area 10B is the bending area, and the third area 10C is the binding area, the vertical distance between the first wiring 104 and the substrate 101 is greater than that the vertical distance between the second wiring 102 and the substrate 101. That is, the first wiring 104 is disposed at a higher position. Therefore, when the second area 10B is bent, the bending stress received by the first wiring 104 is greater than the bending stress received by the second wiring 102. The bending wiring portion 10c is arranged on the first wiring 104 to better disperse the bending stress, thereby further improving the issue of stress concentration generated when the display panel 100 is bent.

The bending manner of the bending wiring portion 10c may be a concave-convex broken line, a wave shape, or a zigzag shape. These bending forms can bend longer first wirings 104 and second wirings 102 in a smaller space, saving the space for arranging the first wirings 104 or the second wirings 102, which is beneficial to the panel narrow borders. In FIGS. 6 and 7, it is illustrated that the bending wiring portion 10c is bent into a concave-convex broken line.

It should be noted that, in the display panel 100 in the embodiment of the present application, both the first wiring 104 and the second wiring 102 may have bending wiring portions 10c.

Optional, please continue to refer to FIG. 6 and FIG. 7, the orthographic projection of part of the bending wiring portion 10c on the substrate 101 is located in the orthographic projection of the through hole 10b on the substrate 101. Part of the bending wiring portion 10c is disposed between the insulating layer 105 and the substrate 101. Because the first wirings 104 and the second wirings 102 are usually made of metal materials, they are likely to have different bending angles with the surrounding inorganic material film layers when they are bent. Therefore, it is designed that the orthographic projection of the partially bending wiring portion 10c on the substrate 101 is located within the orthographic projection of the through hole 10b on the substrate 101. Part of the bending wiring portion 10c is disposed between the insulating layer 105 and the substrate 101. During bending, the insulating layer 105 exerts a certain pressing force on the bending wiring portion 10c to prevent the first wiring 104 or the second wiring 102 from falling off.

Figure 8:
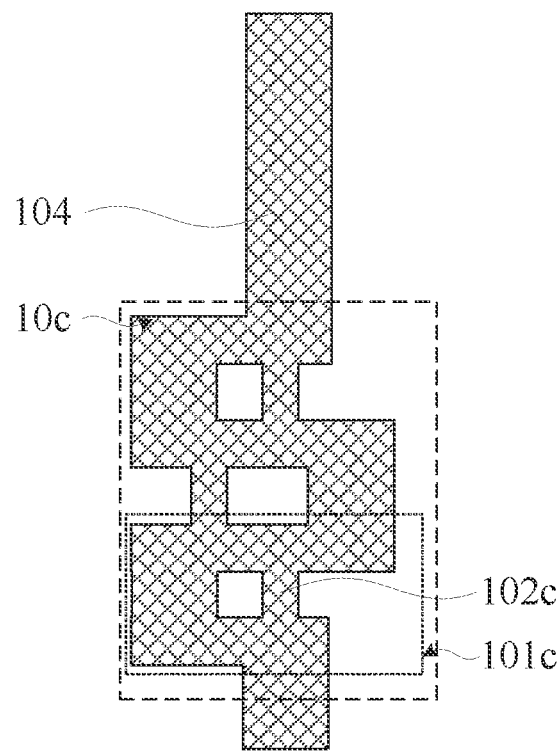
FIG. 8 is a partial structural schematic diagram of a first wiring in a display panel provided by an embodiment of the present application.

Optionally, please refer to FIG. 8, FIG. 8 is a partial structural schematic diagram of the first wiring in the display panel provided by the embodiment of the present application. The bending wiring portion 10c includes a plurality of bending units 101c connected in sequence. The bending unit 101c is connected to at least one parallel wiring 102c. The parallel wiring 102c is arranged in parallel with the bending wiring portion 10c.

A parallel wiring 102c is connected to the bending wiring portion 10c. The parallel wiring 102c is arranged in parallel with the bending wiring portion 10c. Because the bending designs of the first wirings 104 and the second wirings 102 of different rows in the second area 10B are different, uneven etching may occur during the manufacturing process. Therefore, the etching uniformity can be improved by connecting the parallel wirings 102c in the middle. The design of the parallel wiring 102c is equivalent to connecting a resistor in parallel in the bending wiring portion 10c. By adjusting the connection positions of the parallel wirings 102c, the resistance values of the first wirings 104 and the second wirings 102 are kept unchanged, and the winding lengths of the first wirings 104 and the second wirings 102 are also increased. Thereby, the etching uniformity is improved to a certain extent. In addition, adding the parallel wiring 102c can also improve the connection stability of the bending wiring portion 10c. In order to prevent the width of the border of the non-display area of the display panel from being increased, the width of the second area 10B cannot be too large. Then, in the second area 10B, the area where the bending design of the bending wiring portion 10c is performed is small. If the distance between the adjacent bending wiring portions 10c is narrow, the issue of disconnection is likely to occur during etching. Connecting at least one parallel wiring 102c to the bending wiring portion 10c can avoid the issue that the signal cannot be transmitted after a section of the first wiring 104 and the second wiring 102 are disconnected.

It should be noted that, under the condition that the lengths of the first wiring 104 and the second wiring 102 are kept unchanged, the number of parallel wirings 102c can be increased in an area with denser wirings. For example, the length of the bending wiring portion 10c of the first wiring 104 in the via hole 10a away from the third area 10C is shorter, and the bending density in the second area 10B is small, so that the number of parallel wirings 102c can be reduced. The length of the bending wiring portion 10c of the first wiring 104 in the via hole 10a close to the third area 10C is longer, and the bending density in the second area 10B is high, so that the number of parallel wirings 102c can be increased.

Optionally, the number of the bending units 101c may be considered according to the length of the first wiring 104 or the second wiring 102 in the through hole 10b. There is no fixed standard and range for the size of the through hole 10b. The length of the first wiring 104 or the second wiring 102 in the through hole 10b also has no fixed standard and range. It needs to be comprehensively considered according to the resolution, the number of the first wiring 104 and the second wiring 102, and other factors.

In addition, the lateral capacitance between the plurality of first wirings 104 and the plurality of second wirings 102 also needs to be considered. Because the first wiring 104 may be a signal line in the display panel. In high-resolution panels, small differences between signal lines have a greater impact on pixel display. The greater the number of the first wirings 104, the greater the difference between the lateral capacitances. Then, when there are many first wirings 104 and second wirings 102, the distance between adjacent first wirings 104 and adjacent second wirings 102 will be reduced. Therefore, the number of the bending units 101c should be more, so as to increase the distance between the adjacent first wirings 104 and the adjacent second wirings 102 under the same wiring length. Therefore, optionally, the number of the first wiring 104 and the number of the second wiring 102 are proportional to the number of the bending units 101c.

It should be noted that, in FIG. 8, the first wiring 104 is used as an example, and the second wiring 102 may also have the same design, which will not be repeated here.

Figure 9:
FIG. 9 is a schematic structural diagram of a display device provided by an embodiment of the present application.

Correspondingly, an embodiment of the present application further provides a display device. Please refer to FIG. 9, which is a schematic structural diagram of a display device provided by an embodiment of the present application. The display device 1000 includes a display panel 100 and a packaging structure 200. The display panel 100 is the display panel 100 described in any one of the above. The packaging structure 200 is disposed on the display panel 100.

The display device 1000 provided by the embodiment of the present application includes a display panel 100. The display panel 100 has a first area, a second area, and a third area arranged in sequence. The display panel 100 includes a substrate, a plurality of first wirings, and a plurality of second wirings. The first wirings are arranged on the substrate and are arranged at intervals. The first wiring extends from the first area to the second area. The second wirings are arranged on the substrate and are arranged at intervals. The second wiring extends from the second area to the third area. The first wiring and the second wiring are arranged in different layers. The first wirings and the second wirings are connected in a one-to-one correspondence through via holes. The via hole are staggered in the second area. In the display panel provided by the embodiment of the present application, the via holes connecting the first wirings and the second wirings are staggered. In the process of making the via holes, even if the issue of over-etching occurs, the grooves produced by the over-etching will not be on the same straight line with the adjacent via holes. Therefore, the stress at the grooves and the via holes can be dispersed, and the issue of stress concentration occurring at the via holes of the transfer wirings can be improved.

Optionally, the first area may be a display area, the second area may be a bending area, and the third area may be a binding area. In order to increase the screen ratio of the display area of the display panel 100, the frame of the display panel 100 is narrowed. Generally, a part of the display panel 100 can be bent to the back of the display panel 100. In this embodiment, the third area can be bent to the back of the display panel 100. In order to prevent the wirings from being exposed to the outside during bending, the first wirings in the display area are usually transferred to the second wirings made of the lower metal film layer through via holes, and then bent to the back of the display panel 100.

In the embodiment of the present application, because the via holes are disposed in dislocation, the grooves generated by over-etching are not easily connected together during fabrication. Therefore, the issue of stress concentration at the via hole is not easy to occur. When the third area of the display panel 100 is bent to the back of the display panel 100, the issue of film breakage due to the bending stress will not occur, and the failure of the display panel can be avoided.

The display panel and the display device provided by the embodiments of the present application have been described in detail above. Specific examples are used herein to illustrate the principles and implementations of the present application. The descriptions of the above embodiments are only used to help understand the method and the core idea of the present application. In addition, for those skilled in the art, according to the idea of the present application, there will be changes in the specific embodiments and application scope. In conclusion, the content of this specification should not be construed as a limitation on the present application.

What is claimed is:

1. A display panel, wherein the display panel has a first area, a second area, and a third area arranged in sequence, and the display panel comprises:
   a substrate;
   a plurality of first wirings, wherein the first wirings are arranged on the substrate and are arranged at intervals, and the first wirings extend from the first area to the second area; and
   a plurality of second wirings, wherein the second wirings are arranged on the substrate and arranged at intervals, the second wirings extend from the second area to the third area, the first wirings and the second wirings are arranged in different layers, the first wirings and the second wirings are connected in a one-to-one correspondence through via holes, and the via holes are staggered in the second area;
   wherein at least a part of the first wiring or at least a part of the second wiring has a bending wiring portion.

2. The display panel according to claim 1, wherein the display panel further comprises an insulating layer, the insulating layer is arranged on a side of the first wiring and the second wiring away from the substrate, the insulating layer is provided with a through hole, and an orthographic projection of the via hole on the substrate is located within an orthographic projection of the through hole on the substrate.

3. The display panel according to claim 2, wherein adjacent n through holes form a group, and corresponding via holes in each group of the through holes are arranged in a staggered manner, wherein n is a natural number greater than or equal to 2.

4. The display panel according to claim 1, wherein the display panel further comprises a chip on film, the chip on film is arranged in the third area, the second wiring is connected with the chip on film, and the second area is a bending area.

5. The display panel according to claim 1, wherein the bending wiring portion is arranged in the second area.

6. The display panel according to claim 1, wherein the bending wiring portion comprises a plurality of bending units connected in sequence, the bending units are connected to at least one parallel wiring, and the parallel wiring is arranged in parallel with the bending wiring portion.

7. The display panel according to claim 1, wherein a width of the first wiring is greater than a width of the second wiring.

8. The display panel according to claim 1, wherein a vertical distance between the first wiring and the substrate is greater than a vertical distance between the second wiring and the substrate.

9. The display panel according to claim 8, wherein the display panel further comprises an interlayer insulating layer, the interlayer insulating layer is arranged on the second wiring, the first wiring is arranged on the interlayer insulating layer, and the via hole is opened on the interlayer insulating layer.

10. A display device, wherein the display device comprises a display panel and a packaging structure, the display panel has a first area, a second area, and a third area arranged in sequence, and the display panel comprises:
    a substrate;
    a plurality of first wirings, wherein the first wirings are arranged on the substrate and are arranged at intervals, and the first wirings extend from the first area to the second area; and
    a plurality of second wirings, wherein the second wirings are arranged on the substrate and arranged at intervals, the second wirings extend from the second area to the third area, the first wirings and the second wirings are arranged in different layers, the first wirings and the second wirings are connected in a one-to-one correspondence through via holes, and the via holes are staggered in the second area;
    wherein the packaging structure is arranged on the display panel;
    wherein at least a part of the first wiring or at least a part of the second wiring has a bending wiring portion.

11. The display device according to claim 10, wherein the display panel further comprises a chip on film, the chip on film is arranged in the third area, the second wiring is connected with the chip on film, and the second area is a bending area.

12. The display device according to claim 10, wherein the display panel further comprises an insulating layer, the insulating layer is arranged on a side of the first wiring and the second wiring away from the substrate, the insulating layer is provided with a through hole, and an orthographic projection of the via hole on the substrate is located within an orthographic projection of the through hole on the substrate.

13. The display device according to claim 12, wherein adjacent n through holes form a group, and corresponding via holes in each group of the through holes are arranged in a staggered manner, wherein n is a natural number greater than or equal to 2.

14. The display device according to claim 10, wherein a width of the first wiring is greater than a width of the second wiring.

15. The display device according to claim 10, wherein the bending wiring portion is arranged in the second area.

16. The display device according to claim 10, wherein the bending wiring portion comprises a plurality of bending units connected in sequence, the bending units are connected to at least one parallel wiring, and the parallel wiring is arranged in parallel with the bending wiring portion.

17. The display device according to claim 10, wherein a vertical distance between the first wiring and the substrate is greater than a vertical distance between the second wiring and the substrate.

18. The display device according to claim 17, wherein the display panel further comprises an interlayer insulating layer, the interlayer insulating layer is arranged on the second wiring, the first wiring is arranged on the interlayer insulating layer, and the via hole is opened on the interlayer insulating layer.

19. A display panel, wherein the display panel has a first area, a second area, and a third area arranged in sequence, and the display panel comprises:
 a substrate;
 a plurality of first wirings, wherein the first wirings are arranged on the substrate and are arranged at intervals, and the first wirings extend from the first area to the second area; and
 a plurality of second wirings, wherein the second wirings are arranged on the substrate and arranged at intervals, the second wirings extend from the second area to the third area, the first wirings and the second wirings are arranged in different layers, the first wirings and the second wirings are connected in a one-to-one correspondence through via holes, and the via holes are staggered in the second area;
 wherein the display panel further comprises a chip on film, the chip on film is arranged in the third area, the second wiring is connected with the chip on film, and the second area is a bending area.

20. The display device according to claim 19, wherein at least a part of the first wiring or at least a part of the second wiring has a bending wiring portion.

* * * * *